US011869694B1

(12) United States Patent
Li et al.

(10) Patent No.: US 11,869,694 B1
(45) Date of Patent: Jan. 9, 2024

(54) LOW-TEMPERATURE RESISTANT PERFLUOROPOLYETHER-BASED MAGNETIC LIQUID AND PREPARATION METHOD THEREOF

(71) Applicant: Tsinghua University, Beijing (CN)

(72) Inventors: Decai Li, Beijing (CN); Shilin Nie, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 18/337,796

(22) Filed: Jun. 20, 2023

(30) Foreign Application Priority Data

Jul. 4, 2022 (CN) ......................... 202210777827.8

(51) Int. Cl.
*H01F 1/44* (2006.01)

(52) U.S. Cl.
CPC .................................... *H01F 1/445* (2013.01)

(58) Field of Classification Search
CPC .......... H01F 1/445; H01F 1/447; H01F 1/442; H01F 1/44
See application file for complete search history.

(56) References Cited

FOREIGN PATENT DOCUMENTS

| | | | |
|---|---|---|---|
| CN | 103680797 | A | 3/2014 |
| CN | 108587569 | A | 9/2018 |
| CN | 109243749 | A | 1/2019 |
| CN | 103680799 | A | 3/2023 |
| JP | 2004-140259 | A | 5/2004 |

OTHER PUBLICATIONS

Machine translation of CN103680799, 15 pages. (Year: 2014).*
OA for CN application 2022107778278.
English translation of OA for CN application 2022107778278.
Notice of Allowance for CN application 2022107778278.
English translation of Notice of Allowance for CN application 2022107778278.

* cited by examiner

*Primary Examiner* — Matthew E. Hoban
*Assistant Examiner* — Lynne Edmondson

(57) ABSTRACT

A preparation method of a perfluoropolyether-based magnetic liquid includes dispersing magnetic nanoparticles coated with graphene oxide into a solution of N,N-dimethylformamide to obtain solution A; dispersing a surfactant into dichloromethane, and adding triethylamine as a cosolvent to obtain solution B; mixing the solution A and the solution B uniformly, heating them under reflux and stirring them for a modification reaction; and after the modification reaction is completed, washing and drying a reaction product to obtain the modified magnetic nanoparticles coated with the graphene oxide; dispersing the modified magnetic nanoparticles coated with the graphene oxide into a base carrier liquid to prepare the perfluoropolyether-based magnetic liquid. The surfactant is a perfluoroalkylamine. The base carrier liquid is a perfluoropolyether oil. The modification reaction is performed at a temperature of 50 to 120° C. for a time period of 20 to 50 hours.

6 Claims, 3 Drawing Sheets

LOW-TEMPERATURE RESISTANT PERFLUOROPOLYETHER-BASED MAGNETIC LIQUID AND PREPARATION METHOD THEREOF

CROSS-REFERENCE TO RELATED APPLICATION

This application claims priority to and benefits of Chinese Patent Application No. 202210777827.8, filed on Jul. 4, 2022, the contents of which are incorporated herein by reference in their entireties for all purposes.

FIELD

The present disclosure generally relates to a technical field of materials, and more particularly to a low-temperature resistant perfluoropolyether-based magnetic liquid and a preparation method thereof.

BACKGROUND

A magnetic liquid is a new type of intelligent material, which is widely used in many high-tech fields such as aerospace, electronic technology, mechanical chemical industry, energy metallurgy, instrumentation, biomedicine and the like. Generally, the magnetic liquid is a colloidal liquid composed of nanoscale magnetic particles highly dispersed in a base carrier liquid (usually an organic solvent or water). An interaction between the base carrier liquid and the magnetic nanoparticles makes the magnetic liquid have both a fluidity of a liquid and a magnetic property of a solid. In general, each nanoparticles surface needs to be provided with an enough repulsive force by a coated surfactant to prevent the magnetic particles from agglomerating together under an action of a gravity, an interparticle magnetic force or a van der Waals force.

In the existing magnetic liquid preparation technology, the preparation method and application of ester-based, kerosene-based, gasoline-based and water-based magnetic liquids have reached a relatively mature and practical stage. However, as the range of application of these types of magnetic liquids expands, their drawbacks become increasingly apparent. For example, these types of magnetic liquids are not stable enough, not resistant to acids and alkalis, and not resistant to radiation, and the magnetic liquids are prone to failure at a low temperature, their applicable fields are limited, cannot meet the needs of some complex industrial environments and so on.

A perfluoropolyether-based magnetic liquid has a surfactant and a base carrier liquid that are both fluoroether materials. A perfluoropolyether has the advantages of a high- and low-temperature resistance, a low saturated vapor pressure, an incombustibility, a chemical inertness, a heat resistance, a stable chemical property, and so on. When the perfluoropolyether is used as a base carrier liquid of a magnetic liquid, it can greatly expand an application field of the magnetic liquid, which has a strong application value. However, due to a small number of types of perfluoropolyether surfactants, it is difficult to realize a stable dispersion of magnetic nanoparticles in the perfluoropolyether. For example, in the Chinese patent CN201310692408.5, a single perfluoropolyether carboxylic acid is used as a surfactant. During a preparation process, the perfluoropolyether carboxylic acid is directly added to an aqueous solution to implement the modification of the exposed magnetic nanoparticles. However, since the perfluoropolyether carboxylic acid is almost insolvable in water, and the stability of the obtained magnetic liquid is poor. In the Chinese patent CN201310692421.0, a surfactant is also directly added into an iron ion solution, and the obtained magnetic liquid is also poor in stability.

SUMMARY

In a first aspect, embodiments of the present disclosure provide a perfluoropolyether-based magnetic liquid, prepared from magnetic nanoparticles coated with graphene oxide, a surfactant and a base carrier liquid; in which the surfactant is a perfluoroalkylamine, a perfluoropolyether carboxylic acid or a mixture thereof; and the base carrier liquid is a perfluoropolyether oil.

In some embodiments, the perfluoropolyether-based magnetic liquid is prepared by a method including following steps: carrying out a surface coating modification of the magnetic nanoparticles coated with the graphene oxide using the surfactant to obtain modified magnetic nanoparticles coated with the graphene oxide, and then dispersing the modified magnetic nanoparticles into the base carrier liquid to prepare the perfluoropolyether-based magnetic liquid.

In some embodiments, in the magnetic nanoparticles coated with the graphene oxide, a mass ratio of the graphene oxide to the magnetic nanoparticles is from 1:20 to 1:1; and the magnetic nanoparticles are any one of $Fe_3O_4$, $\gamma$-$Fe_2O_3$ or $CoFe_2O_4$.

In some embodiments, a mass ratio of the magnetic nanoparticles coated with the graphene oxide to the surfactant is from 20:1 to 1:1.

In some embodiments, a mass-volume ratio of the modified magnetic nanoparticles coated with the graphene oxide to the base carrier liquid is (1 to 2):(1 to 20) g/mL.

In some embodiments, the perfluoroalkylamine is one or a combination of two or more of 1H, 1H-perfluorooctylamine, 1H, 1H-perfluorononylamine or 1H, 1H-perfluorodecylamine.

In some embodiments, the magnetic nanoparticles coated with the graphene oxide is prepared by one of following steps (1), (2), and (3):

(1) ultrasonically dispersing the graphene oxide into an aqueous solution to obtain a graphene oxide aqueous solution; then adding a ferrous ion-containing material and a ferric ion-containing material to the graphene oxide aqueous solution; after mixing them uniformly, adding concentrated ammonia water for a reaction; and after the reaction is completed, magnetically separating, washing, and drying a reaction product under vacuum to obtain $Fe_3O_4$@GO;

(2) ultrasonically dispersing the graphene oxide into an aqueous solution to obtain a graphene oxide aqueous solution; then adding a ferrous ion-containing material and a ferric ion-containing material to the graphene oxide aqueous solution; after mixing them uniformly, adding concentrated ammonia water for a reaction; and after the reaction is completed, magnetically separating, washing, and drying a reaction product in an air atmosphere at 100° C. to obtain $\gamma$-$Fe_2O_3$@GO;

(3) ultrasonically dispersing the graphene oxide into an aqueous solution to obtain a graphene oxide aqueous solution; then adding a ferrous ion-containing material and a divalent cobalt ion-containing material to the graphene oxide aqueous solution; after mixing them uniformly, adding concentrated ammonia water for a reaction; and after the reaction is completed, magnetically separating, washing, and drying a reaction product under vacuum to obtain $CoFe_2O_4$@GO.

In some embodiments, the graphene oxide has an average sheet diameter of 0.5 to 5 μm, a thickness of 0.8 to 1.2 nm, and a carbon-oxygen ratio of 1:1 to 1:3.

In a second aspect, embodiments of the present disclosure further provide a preparation method of the perfluoropolyether-based magnetic liquid described above, including:

S1, dispersing the magnetic nanoparticles coated with the graphene oxide into a solution of N,N-dimethylformamide to obtain solution A;

S2, dispersing the surfactant into dichloromethane, and adding triethylamine as a cosolvent to obtain solution B;

S3, mixing the solution A and the solution B uniformly, heating them under reflux and stirring them for a modification reaction; and after the reaction is completed, washing and drying a reaction product to obtain the modified magnetic nanoparticles coated with the graphene oxide;

S4, dispersing the modified magnetic nanoparticles coated with the graphene oxide into the base carrier liquid to prepare the perfluoropolyether-based magnetic liquid.

In some embodiments, in step S3, the modification reaction is performed at a temperature of 50 to 120° C. for a time period of 20 to 50 hours.

DETAILED DESCRIPTION

Figure 1:
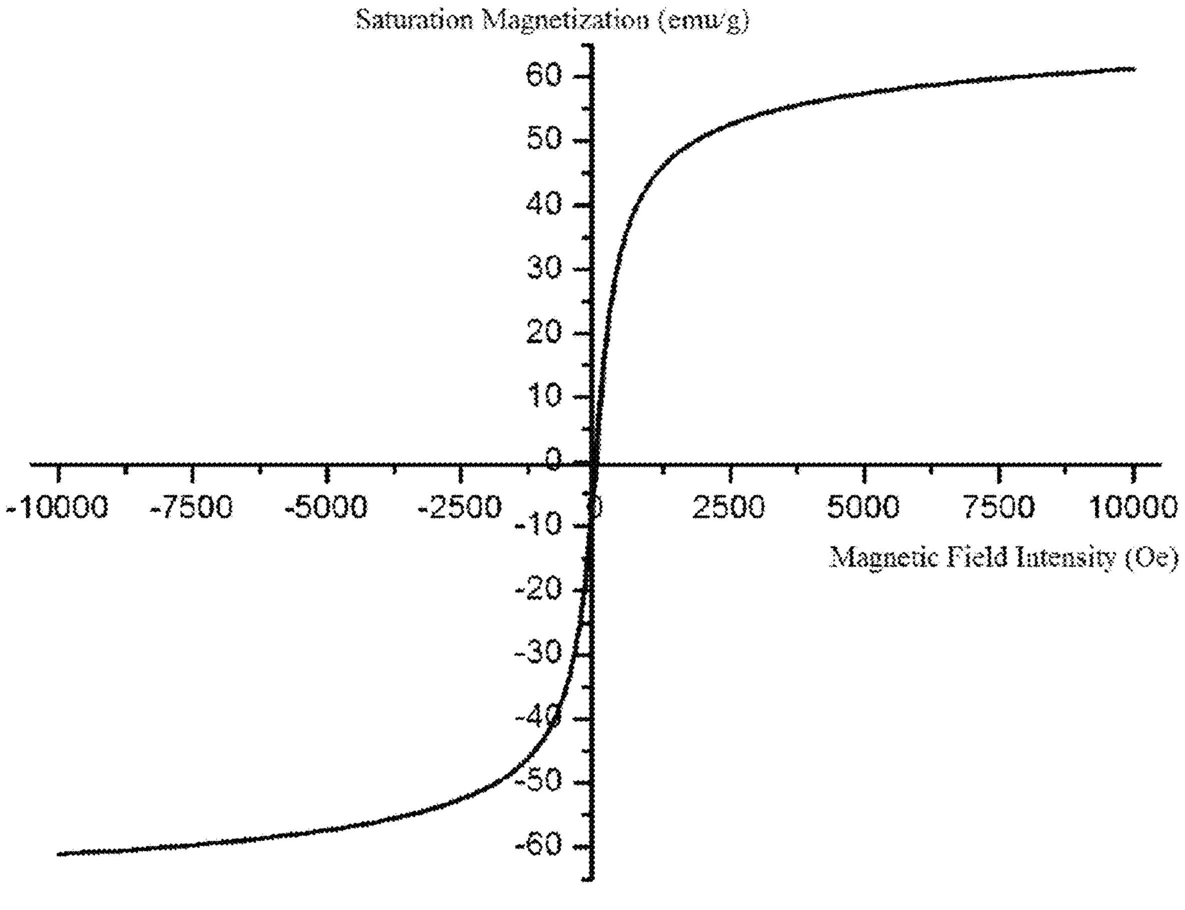
FIG. 1 is a VSM graph of $Fe_3O_4$@GO magnetic particles prepared in Example 1 of the present disclosure.

Embodiments of the present disclosure will be described in detail below. The embodiments described herein are illustrative, and used to generally understand the present disclosure. The embodiments shall not be construed to limit the present disclosure.

The present disclosure aims to solve one of the problems existing in the related art to at least some extent. Therefore, the present disclosure provides a low-temperature resistant perfluoropolyether-based magnetic liquid and a preparation method thereof. The perfluoropolyether-based magnetic liquid has a good stability, can be applied to a wide range of temperature, and especially suitable for a long-term stable work at a low temperature.

In a first aspect, embodiments of the present disclosure provide a perfluoropolyether-based magnetic liquid, prepared from magnetic nanoparticles coated with graphene oxide, a surfactant and a base carrier liquid; in which the surfactant is one or a mixture of a perfluoroalkylamine, and a perfluoropolyether carboxylic acid; and the base carrier liquid is a perfluoropolyether oil.

In the perfluoropolyether-based magnetic liquid in the embodiments of the present disclosure, the graphene oxide is used to coat the magnetic nanoparticles. Because the graphene oxide itself has a good stable dispersion in the perfluoropolyether oil, and has many active sites at the same time. On a basis of providing a certain dispersion stability for the magnetic nanoparticles, the graphene oxide can also provide more adsorption sites for the surfactant, which further improves the dispersion stability of the magnetic nanoparticles in the base carrier liquid of perfluoropolyether oil. The prepared perfluoropolyether-based magnetic liquid has a good stability, is not volatile, can withstand high and low temperature, and is especially suitable for stable work at a low temperature.

In some embodiments, the perfluoropolyether-based magnetic liquid is prepared by a method including following steps: carrying out a surface coating modification of the magnetic nanoparticles coated with the graphene oxide using the surfactant to obtain modified magnetic nanoparticles coated with the graphene oxide, and then dispersing the modified magnetic nanoparticles into the base carrier liquid to prepare the perfluoropolyether-based magnetic liquid. Because the surface of the magnetic particles is coated with the graphene oxide with a large number of active sites, in addition to chemical adsorption on the surface of the magnetic particles, the surfactant can also perform chemical adsorption on the graphene oxide to make the magnetic particles more stably dispersed in the base carrier liquid of perfluoropolyether oil, thus improving the stability of the magnetic liquid.

In some embodiments, in the magnetic nanoparticles coated with the graphene oxide, a mass ratio of the graphene oxide to the magnetic nanoparticles is from 1:20 to 1:1, for example, can be 1:20, 1:18, 1:15, 1:12, 1:10, 1:5, 1:3, 1:2, 1:1, and the like. The magnetic nanoparticles are any one of $Fe_3O_4$, γ-$Fe_2O_3$ or $CoFe_2O_4$.

In some embodiments, a mass ratio of the magnetic nanoparticles coated with the graphene oxide to the surfactant is from 20:1 to 1:1, for example, can be 20:1, 19:1, 15:1, 12:1, 10:1, 5:1, 3:1, 2:1, 1:1, and the like.

In some embodiments, a mass-volume ratio of the modified magnetic nanoparticles coated with the graphene oxide to the base carrier liquid is (1 to 2):(1 to 20) g/mL, for example, can be 1:1 g/mL, 1:2 g/mL, 1:5 g/mL, 1:10 g/mL, 1:16 g/mL, 1:20 g/mL, 2:1 g/mL, 2:7 g/mL, 2:19 g/mL, and the like.

In some embodiments, the perfluoroalkylamine is one or a combination of two or more of 1H, 1H-perfluorooctylamine, 1H, 1H-perfluorononylamine or 1H, 1H-perfluorodecylamine, preferably 1H, 1H-perfluorooctylamine.

In some embodiments, the magnetic nanoparticles coated with the graphene oxide is prepared by one of following steps (1), (2), and (3):

(1) ultrasonically dispersing the graphene oxide into an aqueous solution to obtain a graphene oxide aqueous solution; then adding a ferrous ion-containing material and a ferric ion-containing material to the graphene oxide aqueous solution; after mixing them uniformly, adding concentrated ammonia water for a reaction; and after the reaction is completed, magnetically separating, washing, and drying a reaction product under vacuum to obtain $Fe_3O_4$@GO;

(2) ultrasonically dispersing the graphene oxide into an aqueous solution to obtain a graphene oxide aqueous solution; then adding a ferrous ion-containing material and a ferric ion-containing material to the graphene oxide aqueous solution; after mixing them uniformly, adding concentrated ammonia water for a reaction; and after the reaction is completed, magnetically separating, washing, and drying a reaction product in an air atmosphere at 100° C. to obtain γ-$Fe_2O_3$@GO;

(3) ultrasonically dispersing the graphene oxide into an aqueous solution to obtain a graphene oxide aqueous solution; then adding a ferrous ion-containing material and a divalent cobalt ion-containing material to the graphene oxide aqueous solution; after mixing them uniformly, adding concentrated ammonia water for a reaction; and after the reaction is completed, magnetically separating, washing, and drying a reaction product under vacuum to obtain $CoFe_2O_4$@GO.

In this process, the graphene oxide is used to coat and modify the magnetic nanoparticles. On the one hand, the graphene oxide has many active sites, which can be tightly bound with the magnetic nanoparticles. On the other hand, the graphene oxide itself has a good stable dispersion in the perfluoropolyether oil. Because the surface of the magnetic particles is coated with the graphene oxide with a large number of active sites, in addition to chemical adsorption on the surface of the magnetic nanoparticles, the surfactant can also perform chemical adsorption on the graphene oxide to make the magnetic particles more stably dispersed in the base carrier liquid of perfluoropolyether oil, thus improving the stability of the magnetic liquid.

In some embodiments, the graphene oxide has an average sheet diameter of 0.5 to 5 μm, a thickness of 0.8 to 1.2 nm, and a carbon-oxygen ratio of 1:1 to 1:3.

In some embodiments, the graphene oxide has an average sheet diameter of 0.5 to 5 μm, such as 0.55 μm, 0.8 μm, 1 μm, 2 μm, 3 μm, 3.5 μm, 4 μm, 5 μm, and so on. The graphene oxide has a thickness of 0.8 to 1.2 nm, such as 0.8 nm, 0.85 nm, 0.9 nm, 1.0 nm, 1.1 nm, 1.2 nm, and so on. The graphene oxide has a carbon-oxygen ratio of 1:1 to 1:3, such as 1:1, 1:1.2, 1:1.5, 1:2, 1:2.5, 1:3, and so on.

Figure 4:
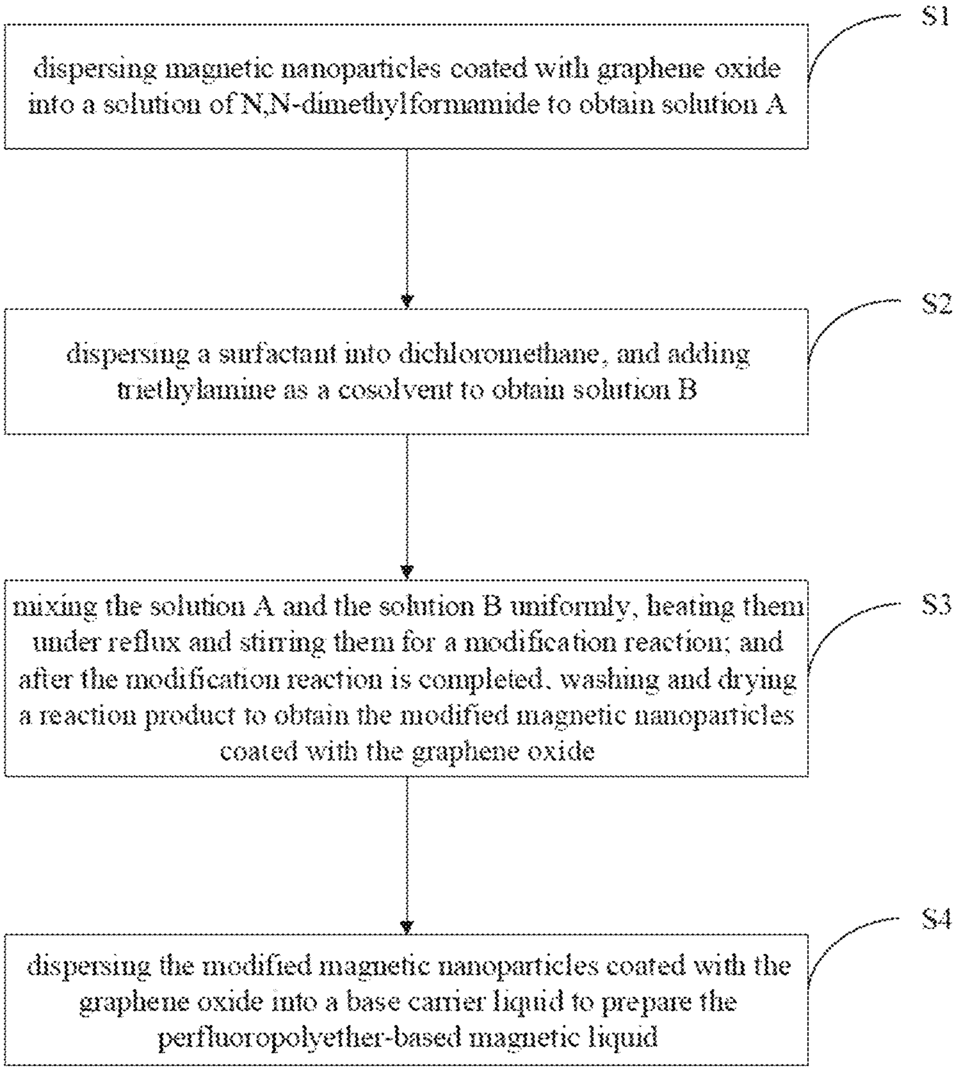
FIG. 4 is a flow diagram of a preparation method of a perfluoropolyether-based magnetic liquid in an embodiment of the present disclosure.

In a second aspect, embodiments of the present disclosure further provide a preparation method of the perfluoropolyether-based magnetic liquid described above. As shown in FIG. 4, the preparation method includes:

S1, dispersing the magnetic nanoparticles coated with the graphene oxide into a solution of N,N-dimethylformamide to obtain solution A;

S2, dispersing the surfactant into dichloromethane, and adding triethylamine as a cosolvent to obtain solution B;

S3, mixing the solution A and the solution B uniformly, heating them under reflux and stirring them for a modification reaction; and after the reaction is completed, using deionized water and ethanol to wash a reaction product several times, and then performing vacuum drying to obtain the modified magnetic nanoparticles coated with the graphene oxide;

S4, dispersing the modified magnetic nanoparticles coated with the graphene oxide into the base carrier liquid to prepare the low-temperature resistant perfluoropolyether-based magnetic liquid.

The preparation method of the perfluoropolyether-based magnetic liquid in the embodiments of the present disclosure has the following advantages: the process is simple, easy to operate, simultaneously has less requirement on the equipment, and is easily applied in various fields. The prepared perfluoropolyether-based magnetic liquid has a good stability, and can be applied to a wide range of temperature.

In some embodiments, in step S3, the modification reaction is performed at a temperature of 50 to 120° C., such as 50° C., 60° C., 75° C., 80° C., 100° C., 110° C., 120° C., and so on. The modification reaction is performed for a time period of 20 to 50 hours, such as 20 h, 30 h, 35 h, 40 h, 50 h, and so on.

The advantages and beneficial effects of the low-temperature resistant perfluoropolyether-based magnetic liquid and the preparation method thereof in the embodiments of the present disclosure are as follows:

In the perfluoropolyether-based magnetic liquid in the embodiments of the present disclosure, the graphene oxide is utilized to coat the magnetic nanoparticles, and uses the surfactant for modification, which improves the dispersion stability of the magnetic nanoparticles in the base carrier liquid of perfluoropolyether oil. The magnetic nanoparticles are distributed uniformly without agglomeration and sedimentation. The prepared perfluoropolyether-based magnetic liquid has a good stability, can be applied to a wide range of temperature, and especially suitable for a long-term stable work at a low temperature. In addition, advantages of an excellent high- and low-temperature resistance, a chemical stability, a non-volatility, and the like of the perfluoropolyether itself will also be possessed by the perfluoropolyether-based magnetic liquid.

In the perfluoropolyether-based magnetic liquid in the embodiments of the present disclosure, by coating the graphene oxide on the surface of the magnetic particles, it is possible to reduce the density of the magnetic particles, and improve the dispersion stability of the magnetic particles. Because the surface of the magnetic particles is coated with the graphene oxide with a large number of active sites, in addition to chemical adsorption on the surface of the magnetic particles, the surfactant can also perform chemical adsorption on the graphene oxide to make the magnetic particles more stably dispersed in the base carrier liquid of perfluoropolyether oil.

The preparation method of the perfluoropolyether-based magnetic liquid proposed in embodiments of the present disclosure is simple in process, easy to operate, and high in efficiency. The prepared perfluoropolyether-based magnetic liquid has a good magnetic property and a stable performance, simultaneously has less requirement on the equipment, and is easily applied in various fields.

The low-temperature resistant perfluoropolyether-based magnetic liquid and the preparation method thereof in embodiments of the present disclosure will be further described in detail below through specific examples.

Example 1

This example provides a perfluoropolyether-based magnetic liquid. The perfluoropolyether-based magnetic liquid is prepared from magnetic nanoparticles ($Fe_3O_4$@GO) coated with graphene oxide, a surfactant (1H, 1H-perfluorooctylamine) and a base carrier liquid (a perfluoropolyether oil).

The preparation method of the perfluoropolyether-based magnetic liquid includes steps as follows:

S1, 2.6 g of graphene oxide (GO) was weighed and ultrasonically dispersed in 513 mL of ultrapure water to obtain a graphene oxide aqueous solution with a mass percent of 0.5%.

Then, 11 g of $FeCl_3 \cdot 6H_2O$ and 9.7 g of $FeCl_2 \cdot 4H_2O$ were added in the graphene oxide aqueous solution, and stirred for 10 min in a water bath at 45° C. to make them mixed uniformly. Then, 17 g of concentrated ammonia water was weighed, and added dropwise to the mixed solution, which was kept heating and stirring for 40 minutes. After the reaction was completed, the reaction product was magnetically separated, washed repeatedly with deionized water, and dried in vacuum at 60° C. for 12 hours to obtain black graphene oxide-coated $Fe_3O_4$ magnetic nanoparticles, namely $Fe_3O_4$@GO.

Then, $Fe_3O_4$@GO was dispersed into 350 mL of a solution of N,N-dimethylformamide (DMF) to obtain solution A.

S2, 1 g of 1H, 1H-perfluorooctylamine (FOA) was dissolved and dispersed into 200 mL of dichloromethane, and 10 mL of triethylamine was added as a co-solvent to obtain solution B.

S3, the solution A obtained in step S1 and the solution B obtained in step S2 were mixed uniformly, placed in a round-bottomed flask, and heated under reflux and stirred at 90° C. for 48 hours to obtain a $Fe_3O_4$@GO-FOA suspension. After being washed several times with deionized water and ethanol, the suspension was dried in vacuum at 60° C. for 18 hours to obtain FOA-modified $Fe_3O_4$@GO, namely $Fe_3O_4$@GO-FOA.

S4, the $Fe_3O_4$@GO-FOA obtained in step S3 was ground, and ultrasonically dispersed in a perfluoropolyether oil to obtain a low-temperature resistant perfluoropolyether-based magnetic liquid.

Figure 2:
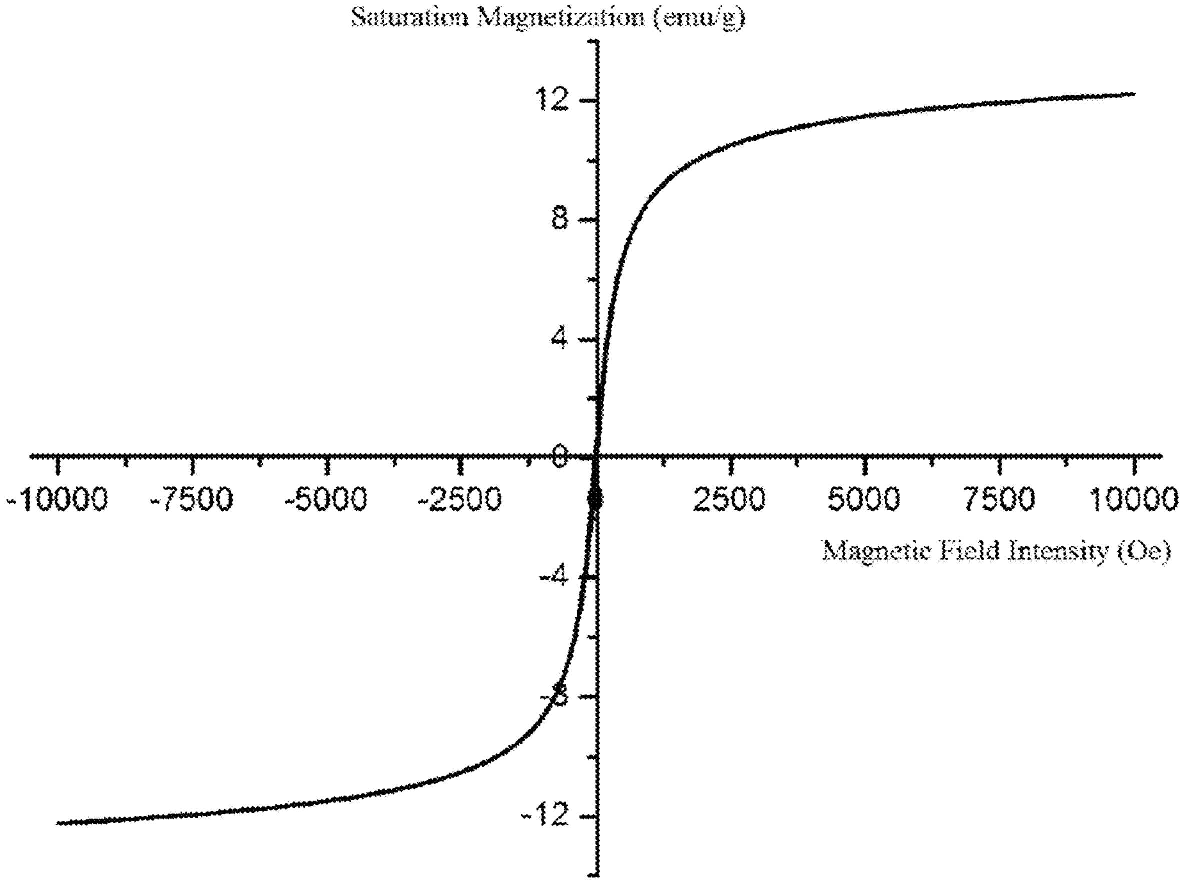
FIG. 2 is a VSM graph of a perfluoropolyether-based magnetic liquid prepared in Example 1 of the present disclosure.
Figure 3:
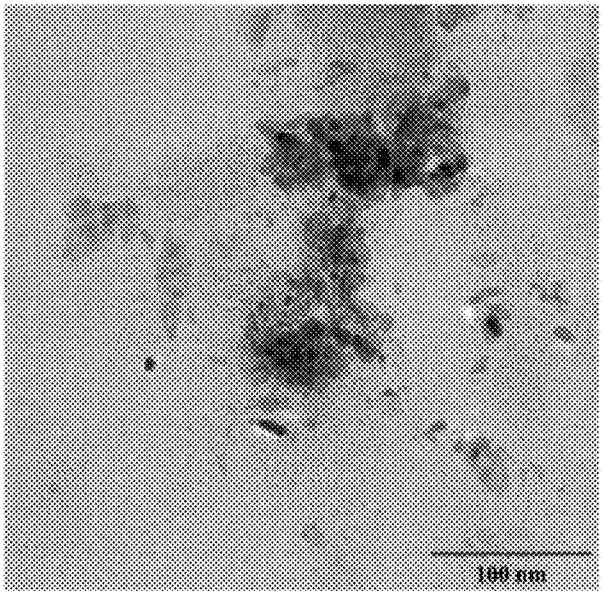
FIG. 3 is a TEM image of $Fe_3O_4$@GO magnetic particles prepared in Example 1 of the present disclosure.

The saturation magnetization tests for the $Fe_3O_4$@GO magnetic particles and the perfluoropolyether-based magnetic liquid were performed in this example, and the VSM graphs are shown in FIG. 1 and FIG. 2, respectively. It can be seen from FIG. 2 that the saturation magnetization of the perfluoropolyether-based magnetic liquid prepared in this example is relatively high, which can reach 245 Gs. A microscopic morphology and structure of $Fe_3O_4$@GO magnetic particles were analyzed by transmission electron microscopy (TEM), and the TEM image is shown in FIG. 3. It can be observed that the magnetic particles are relatively uniform in size, and can be stably dispersed in the base carrier liquid of perfluoropolyether oil without agglomeration and sedimentation. In addition, the perfluoropolyether-based magnetic liquid prepared in this example can be stable in a temperature range of −40° C. to 200° C., can work stably for a long-term at a low temperature, and has a relatively excellent performance.

Example 2

This example provides a perfluoropolyether-based magnetic liquid. The perfluoropolyether-based magnetic liquid is prepared from magnetic nanoparticles ($\gamma$-$Fe_2O_3$@GO) coated with graphene oxide, a surfactant (1H, 1H-perfluorooctylamine) and a base carrier liquid (a perfluoropolyether oil).

The preparation method of the perfluoropolyether-based magnetic liquid includes steps as follows:

S1, 2.6 g of graphene oxide (GO) was weighed and ultrasonically dispersed in 513 mL of ultrapure water to obtain a graphene oxide aqueous solution with a mass percent of 0.5%.

Then, 11 g of $FeCl_3 \cdot 6H_2O$ and 9.7 g of $FeCl_2 \cdot 4H_2O$ were added in the graphene oxide aqueous solution, and stirred for 10 min in a water bath at 45° C. to make them mixed uniformly. Then, 17 g of concentrated ammonia water was weighed, and added dropwise to the mixed solution, which was kept heating and stirring for 40 minutes. After the reaction was completed, the reaction product was magnetically separated, washed repeatedly with deionized water, and dried in an air atmosphere at 100° C. for 12 hours to obtain graphene oxide-coated $\gamma$-$Fe_2O_3$ magnetic nanoparticles, namely $\gamma$-$Fe_2O_3$@GO.

Then, $\gamma$-$Fe_2O_3$@GO was dispersed into 350 mL of a solution of N,N-dimethylformamide (DMF) to obtain solution A.

S2, 1 g of 1H, 1H-perfluorooctylamine (FOA) was dissolved and dispersed into 200 mL of dichloromethane, and 10 mL of triethylamine was added as a co-solvent to obtain solution B.

S3, the solution A obtained in step S1 and the solution B obtained in step S2 were mixed uniformly, placed in a round-bottomed flask, and heated under reflux and stirred at 90° C. for 48 hours to obtain a $\gamma$-$Fe_2O_3$@GO-FOA suspension. After being washed several times with deionized water and ethanol, the suspension was dried in vacuum at 60° C. for 18 hours to obtain FOA-modified $\gamma$-$Fe_2O_3$@GO, namely $\gamma$-$Fe_2O_3$@GO-FOA.

S4, the $\gamma$-$Fe_2O_3$@GO-FOA obtained in step S3 was ground, and ultrasonically dispersed in a perfluoropolyether oil to obtain a low-temperature resistant perfluoropolyether-based magnetic liquid.

The magnetic particles in this example are uniform in size, and can be stably dispersed in the base carrier liquid of perfluoropolyether oil without agglomeration and sedimentation. A saturation magnetization of the prepared perfluoropolyether-based magnetic liquid is 203 Gs. The perfluoropolyether-based magnetic liquid can be stable in a temperature range of −40° C. to 200° C., can work stably for a long-term at a low temperature, and has a relatively excellent performance.

Example 3

This example provides a perfluoropolyether-based magnetic liquid. The perfluoropolyether-based magnetic liquid is prepared from magnetic nanoparticles ($CoFe_2O_4$@GO) coated with graphene oxide, a surfactant (1H, 1H-perfluorooctylamine) and a base carrier liquid (a perfluoropolyether oil).

The preparation method of the perfluoropolyether-based magnetic liquid includes steps as follows:

S1, 2.6 g of graphene oxide (GO) was weighed and ultrasonically dispersed in 513 mL of ultrapure water to obtain a graphene oxide aqueous solution with a mass percent of 0.5%.

Then, 9.7 g of $CoCl_2 \cdot 6H_2O$ and 9.7 g of $FeCl_2 \cdot 4H_2O$ were added in the graphene oxide aqueous solution, and stirred for 10 min in a water bath at 45° C. to make them mixed uniformly. Then, 17 g of concentrated ammonia water was weighed, and added dropwise to the mixed solution, which was kept heating and stirring for 40 minutes. After the reaction was completed, the reaction product was magnetically separated, washed repeatedly with deionized water, and dried in vacuum at 60° C. for 12 hours to obtain black graphene oxide-coated $CoFe_2O_4$ magnetic nanoparticles, namely $CoFe_2O_4$@GO.

Then, $CoFe_2O_4$@GO was dispersed into 350 mL of a solution of N,N-dimethylformamide (DMF) to obtain solution A.

S2, 1 g of 1H, 1H-perfluorooctylamine (FOA) was dissolved and dispersed into 200 mL of dichloromethane, and 10 mL of triethylamine was added as a co-solvent to obtain solution B.

S3, the solution A obtained in step S1 and the solution B obtained in step S2 were mixed uniformly, placed in a round-bottomed flask, and heated under reflux and stirred at 90° C. for 48 hours to obtain a $CoFe_2O_4$@GO-FOA suspension. After being washed several times with deionized water and ethanol, the suspension was dried in vacuum at 60° C. for 18 hours to obtain FOA-modified $CoFe_2O_4$@GO, namely $CoFe_2O_4$@GO-FOA.

S4, the $CoFe_2O_4$@GO-FOA obtained in step S3 was ground, and ultrasonically dispersed in a perfluoropolyether oil to obtain a low-temperature resistant perfluoropolyether-based magnetic liquid.

The magnetic particles in this example are uniform in size, and can be stably dispersed in the base carrier liquid of perfluoropolyether oil without agglomeration and sedimentation. A saturation magnetization of the prepared perfluoropolyether-based magnetic liquid is 216 Gs. The perfluoropolyether-based magnetic liquid can be stable in a temperature range of −40° C. to 200° C., can work stably for a long-term at a low temperature, and has a relatively excellent performance.

Reference throughout this specification to terms "an embodiment," "some embodiments," "an example," "a specific example," or "some examples," means that a particular feature, structure, material, or characteristic described in connection with the embodiment or example is included in at least one embodiment or example of the present disclosure. Thus, the demonstrative representations of the terms throughout this specification are not necessarily referring to the same embodiment or example of the present disclosure. Furthermore, the particular features, structures, materials, or characteristics may be combined in any suitable manner in any one or more embodiments or examples. In addition, those skilled in the art can combine the different embodiments or examples and the features thereof described in this specification without being mutually inconsistent.

Although explanatory embodiments have been shown and described, it would be appreciated by those skilled in the art that the above embodiments are exemplary and cannot be construed to limit the present disclosure, and changes, alternatives, substitutions and modifications can be made in the embodiments by those skilled in the art without departing from the scope of the present disclosure.

What is claimed is:

1. A preparation method of a perfluoropolyether-based magnetic liquid, comprising:

S1, dispersing magnetic nanoparticles coated with graphene oxide into a solution of N,N-dimethylformamide to obtain solution A;

S2, dispersing a surfactant into dichloromethane, and adding triethylamine as a cosolvent to obtain solution B;

S3, mixing the solution A and the solution B uniformly, heating them under reflux and stirring them for a modification reaction; and after the modification reaction is completed, washing and drying a reaction product to obtain the modified magnetic nanoparticles coated with the graphene oxide;

S4, dispersing the modified magnetic nanoparticles coated with the graphene oxide into a base carrier liquid to prepare the perfluoropolyether-based magnetic liquid;

wherein the surfactant is a perfluoroalkylamine; and the base carrier liquid is a perfluoropolyether oil;

a mass ratio of the magnetic nanoparticles coated with the graphene oxide to the surfactant is from 20:1 to 1:1; the modification reaction is performed at a temperature of 50 to 120° C. for a time period of 20 to 50 hours.

2. The preparation method of the perfluoropolyether-based magnetic liquid according to claim 1, wherein in the magnetic nanoparticles coated with the graphene oxide, a mass ratio of the graphene oxide to the magnetic nanoparticles is from 1:20 to 1:1; and the magnetic nanoparticles are any one of $Fe_3O_4$, $\gamma$-$Fe_2O_3$ or $CoFe_2O_4$.

3. The preparation method of the perfluoropolyether-based magnetic liquid according to claim 1, wherein a mass-volume ratio of the modified magnetic nanoparticles coated with the graphene oxide to the base carrier liquid is (1 to 2):(1 to 20) g/mL.

4. The preparation method of the perfluoropolyether-based magnetic liquid according to claim 1, wherein the perfluoroalkylamine is one or a combination of two or more of 1H, 1H-perfluorooctylamine, 1H, 1H-perfluorononylamine or 1H, 1H-perfluorodecylamine.

5. The preparation method of the perfluoropolyether-based magnetic liquid according to claim 1, wherein the magnetic nanoparticles coated with the graphene oxide is prepared by one of following steps (1), (2), and (3):

(1) ultrasonically dispersing the graphene oxide into an aqueous solution to obtain a graphene oxide aqueous solution; then adding a ferrous ion-containing material and a ferric ion-containing material to the graphene oxide aqueous solution; after mixing them uniformly, adding concentrated ammonia water for a reaction; and after the reaction is completed, magnetically separating, washing, and drying a reaction product under vacuum to obtain $Fe_3O_4$@GO;

(2) ultrasonically dispersing the graphene oxide into an aqueous solution to obtain a graphene oxide aqueous solution; then adding a ferrous ion-containing material and a ferric ion-containing material to the graphene oxide aqueous solution; after mixing them uniformly, adding concentrated ammonia water for a reaction; and after the reaction is completed, magnetically separating, washing, and drying a reaction product in an air atmosphere at 100° C. to obtain $\gamma$-$Fe_2O_3$@GO;

(3) ultrasonically dispersing the graphene oxide into an aqueous solution to obtain a graphene oxide aqueous solution; then adding a ferrous ion-containing material and a divalent cobalt ion-containing material to the graphene oxide aqueous solution; after mixing them uniformly, adding concentrated ammonia water for a reaction; and after the reaction is completed, magnetically separating, washing, and drying a reaction product under vacuum to obtain $CoFe_2O_4$@GO.

6. The preparation method of the perfluoropolyether-based magnetic liquid according to claim 1, wherein the graphene oxide has an average sheet diameter of 0.5 to 5 μm, a thickness of 0.8 to 1.2 nm, and a carbon-oxygen ratio of 1:1 to 1:3.

* * * * *